US011903890B2

(12) United States Patent
Briggs

(10) Patent No.: US 11,903,890 B2
(45) Date of Patent: Feb. 20, 2024

(54) KNEE REHABILITATION DEVICE

(71) Applicant: Motus X, PLLC, Cookeville, TN (US)

(72) Inventor: Sonya Annette Briggs, Algood, TN (US)

(73) Assignee: Motus X, PLLC, Cookeville, TN (US)

( * ) Notice: Subject to any disclaimer, the term of this patent is extended or adjusted under 35 U.S.C. 154(b) by 739 days.

(21) Appl. No.: 15/798,826

(22) Filed: Oct. 31, 2017

(65) Prior Publication Data

US 2018/0250185 A1 Sep. 6, 2018

Related U.S. Application Data

(60) Provisional application No. 62/465,995, filed on Mar. 2, 2017.

(51) Int. Cl.
*A61H 1/02* (2006.01)
*A61H 1/00* (2006.01)

(52) U.S. Cl.
CPC .............. *A61H 1/024* (2013.01); *A61H 1/008* (2013.01); *A61H 2201/0107* (2013.01); *A61H 2201/0161* (2013.01); *A61H 2201/1269* (2013.01); *A61H 2201/164* (2013.01); *A61H 2201/1635* (2013.01); *A61H 2201/1642* (2013.01); *A61H 2201/5069* (2013.01); *A61H 2203/0425* (2013.01)

(58) Field of Classification Search
CPC ...... A61H 1/024; A61H 1/008; A61H 1/0262; A61H 1/0237; A61H 1/0255; A61H 1/02; A61H 2201/0161; A61H 2201/1269; A61H 2201/1642; A61H 3/02; A61H 2205/10; A61H 2205/102; A61H 2205/103; A61H 2205/104; A61H 2205/106
USPC .......... 601/23, 122, 128, 131, 134; 482/131, 482/132, 139, 41–42, 79–80
See application file for complete search history.

(56) References Cited

U.S. PATENT DOCUMENTS 3,413,971 A * 12/1968 Evans .................. A61H 1/0218 602/32
5,236,333 A * 8/1993 Barba, Jr. .............. A61H 1/024 482/125
5,643,182 A * 7/1997 Engel ................. A61H 15/0092 601/119
5,720,699 A * 2/1998 Musachio .............. A63B 21/05 482/121
5,887,945 A * 3/1999 Sedlack ................. A47D 13/10 280/47.25

(Continued)

OTHER PUBLICATIONS

International Search Report in corresponding International Application No. PCT/2018/020397 dated May 15, 2018, 9 pp.

*Primary Examiner* — Tu A Vo
*Assistant Examiner* — Kelsey E Baller
(74) *Attorney, Agent, or Firm* — Shane Cortesi

(57) ABSTRACT

A knee rehabilitation device may include a left post and a right post, an upper transverse post and a lower transverse post. The transverse posts may extend from the left post to the right post and may include foam pads that are configured to rest against opposing sides of the user's legs. The left and right posts may be angled to facilitate handling of the device. The transverse posts may be attached to the left and right posts by clamps that allow the transverse posts to slide along the height of the left and right posts.

24 Claims, 7 Drawing Sheets

(56) References Cited

U.S. PATENT DOCUMENTS

| | | | | |
|---|---|---|---|---|
| 6,203,473 | B1 * | 3/2001 | Atwood | A63B 21/00047 482/142 |
| 8,870,715 | B2 * | 10/2014 | Stiles | A61H 1/024 482/49 |
| 9,056,042 | B2 | 6/2015 | Russell | |
| 9,408,770 | B2 | 8/2016 | Hall | |
| 9,492,342 | B2 * | 11/2016 | Hall | A61H 1/024 |
| 9,873,010 | B2 * | 1/2018 | Marti | A63B 21/00069 |
| 10,357,423 | B2 * | 7/2019 | Davis | A61H 1/0237 |
| 10,420,691 | B2 * | 9/2019 | Stewart | A61H 1/024 |
| 2002/0193710 | A1 * | 12/2002 | Main | A61H 1/024 601/5 |
| 2005/0098697 | A1 * | 5/2005 | Collins | F16L 3/13 248/231.71 |
| 2005/0159688 | A1 * | 7/2005 | Sakamoto | A61H 15/0092 601/123 |
| 2007/0001502 | A1 * | 1/2007 | Welsh | A47C 7/52 297/423.4 |
| 2008/0182730 | A1 * | 7/2008 | Conley | A61H 1/0244 482/95 |
| 2010/0216614 | A1 | 8/2010 | Rivas | |
| 2011/0046525 | A1 | 2/2011 | Stiles | |
| 2011/0137215 | A1 | 6/2011 | LeBlanc | |
| 2011/0224585 | A1 * | 9/2011 | Hall | A61H 1/008 601/34 |
| 2013/0225378 | A1 | 8/2013 | Burek | |
| 2014/0073998 | A1 * | 3/2014 | Keiser | A63B 21/00185 601/34 |
| 2014/0094721 | A1 | 4/2014 | Diallo | |
| 2014/0200490 | A1 * | 7/2014 | Kie | A61H 1/024 601/5 |
| 2014/0329649 | A1 * | 11/2014 | Boutros | A61H 1/0244 482/131 |
| 2017/0239119 | A1 * | 8/2017 | Stewart | A61H 1/0259 |
| 2019/0133864 | A1 * | 5/2019 | Cook | A61H 1/024 |
| 2019/0142679 | A1 * | 5/2019 | Kramer | A61H 1/024 601/34 |
| 2020/0030174 | A1 * | 1/2020 | Han | A61H 1/02 |
| 2020/0046593 | A1 * | 2/2020 | Tsukasako | A61H 1/0266 |

* cited by examiner

KNEE REHABILITATION DEVICE

RELATED APPLICATIONS

This application claims priority under 35 USC 119 to U.S. Provisional Application No. 62/465,995, filed Mar. 2, 2017, the contents of which are incorporated herein by reference in their entirety.

BACKGROUND

Technical Field

The present invention relates to rehabilitation devices for persons who have had knee surgeries or other knee problems.

Background of the Invention

There is a need to gain range of motion (ROM) in the legs of patients undergoing knee replacement and those having other knee issues that limit range of motion. It is particularly desirable to allow an affected person to range their knee like a therapist would, which is a joint mobilization in conjunction with a stretch.

Promotus (Salt Lake City, Utah) sells a knee rehabilitation device under the name KNEEMD. According to the website for the product, KNEEMD is the first patient-controlled knee rehabilitation device to facilitate improved range of motion and stretch in extension for patients who have undergone total knee replacements or other major knee surgeries. Unfortunately, the KNEEMD is a bulky and very expensive product, retailing at nearly $1,000. Moreover, the KNEEMD does only knee extension and does not do knee flexion or joint mobilization.

Thus, there is a continuing need for economical devices that increase range of motion and are capable of doing knee extension, knee flexion and joint mobilization.

BRIEF SUMMARY

The present disclosure provides a knee rehabilitation device and method of using the same as described herein.

In some embodiments, the present disclosure provides a knee rehabilitation device configured to increase the range of motion of a leg of a human user having a first side (e.g., front) and a second side (e.g., rear) opposite the first side and a knee. Optionally, the device includes a left post having a left post top end, a left post bottom end (which may have a non-slip surface) and configured to rest on the ground, and a left post height extending from the left post top end to the left post bottom end. Optionally, the device further includes a right post having a right post top end, a right post bottom end (which may have a non-slip surface) and configured to rest on the ground, and a right post height extending from the right post top end to the right post bottom end, the right post height generally parallel to the left post height. Optionally, the device further includes an upper transverse bar extending between the left post and the right post, the upper transverse bar comprising a foam pad (preferably a closed cell foam pad) configured to rest against the first side of the user's leg, the upper transverse bar attached (preferably removably and slideably attached to) the left post and the right post and configured to slide along the left post height and the right post height, the upper transverse bar comprising an upper transverse bar left end, an upper transverse bar right end, and an upper transverse bar length extending from the upper transverse bar left end to the upper transverse bar right end, the upper transverse bar length transverse to the left post height and the right post height. Optionally, the device further includes a lower transverse bar located below the upper transverse bar and extending between the left post and the right post, the lower transverse bar comprising a foam pad (preferably a closed cell foam pad) configured to rest against the user's leg below the user's knee, the lower transverse bar attached (preferably removably and slideably attached to) to the left post and the right post and configured to slide along the left post height and the right post height, the lower transverse bar comprising a lower transverse bar left end, a lower transverse bar right end, and an lower transverse bar length extending from the lower transverse bar left end to the lower transverse bar right end, the lower transverse bar length transverse to the left post height and the right post height.

Optionally, the left post and the right post are rigid and the upper transverse bar and the lower transverse bar, with possible exception of the foam pads, are rigid. Optionally, the left end of the upper transverse bar and the left end of the lower transverse bar each comprise a clamp attaching the transverse bars to the left post and further wherein the right end of the upper transverse bar and the right end of the lower transverse bar each comprise a clamp attaching the transverse bars to the right post, the clamps slideable along the left post and right post heights. Optionally, the clamps removably attach the upper and lower transverse bars to the left and right posts. Optionally, the clamps are c-clamps. Optionally, the foam pad of the upper transverse bar is cylindrical in shape and comprises a hole receiving the upper transverse bar and further wherein the foam pad of the lower transverse bar is cylindrical in shape and comprises a hole receiving the lower transverse bar. Optionally, the left post and the right post are generally cylindrical in shape. Optionally, the lower transverse bar and the upper transverse bar each comprise a center and the device is symmetrical about the centers (i.e., the left-right symmetry). Optionally, the left post top end and the right post top end comprise a pivoting handle. Optionally, the left post top end is curved relative to the left post bottom end and the right post top end is curved relative to the right post bottom end (e.g., at an angle of between about 30 degrees and 60 degrees). Optionally, the device left post, right post, upper transverse bar and lower transverse bar are comprised of rigid plastic. Optionally, the left post is a mirror image of the right post and the upper transverse bar is a mirror image of the lower transverse bar. Optionally, the left post height and the right post height are adjustable.

Optionally, the knee rehabilitation device is comprised of biocompatible plastics (e.g., medical-grade plastics that are sterilizable and/or hypoallergenic). Optionally, the left post and the right post comprise a non-slip surface adjacent to the top ends (to facilitate handling and prevent slippage).

Optionally, the device further comprises an angle gauge configured to measure orientation of the device. Optionally, the gauge is attached (removalaby or unremovably) to the left post or the right post.

The present disclosure further provides a method increasing range of motion of a leg of a human, the human's leg having a knee, a front side and a rear side, the method comprising the steps of: a) providing the knee rehabilitation device having one or more features described above; b) positioning the foam pad of the upper transverse bar against the front side of the human's leg adjacent to the knee and positioning the foam pad of the lower transverse bar against the rear side of the human's leg so that the user's legs is in a bent position; and c) moving the top ends of the left and right posts (e.g., downwardly if the user is in a sitting position) so that the user's leg begins to straighten.

The present disclosure also provides a method increasing range of motion of a leg of a human, the human's leg having a knee, a front side and a rear side, the method comprising the steps of: a) providing the knee rehabilitation device having one or more features described above; b) positioning the foam pad of the upper transverse bar against the rear side of the human's leg behind the knee and positioning the foam pad of the lower transverse bar against the front side of the human's leg so that the user's legs is in a slightly bent position; and c) moving the top ends of the left and right posts (e.g., in a forward direction) so that the user's leg becomes further bent.

Optionally, the device further comprises an angle gauge configured to measure the differential orientation of the device between steps b) and c).

BRIEF DESCRIPTION OF THE DRAWINGS

in FIG. 3C, the left post is received in the clamp of the lower transverse bar.

in FIG. 3D the left post is not received in the clamp of the lower transverse bar.

DETAILED DESCRIPTION

Figure 1:
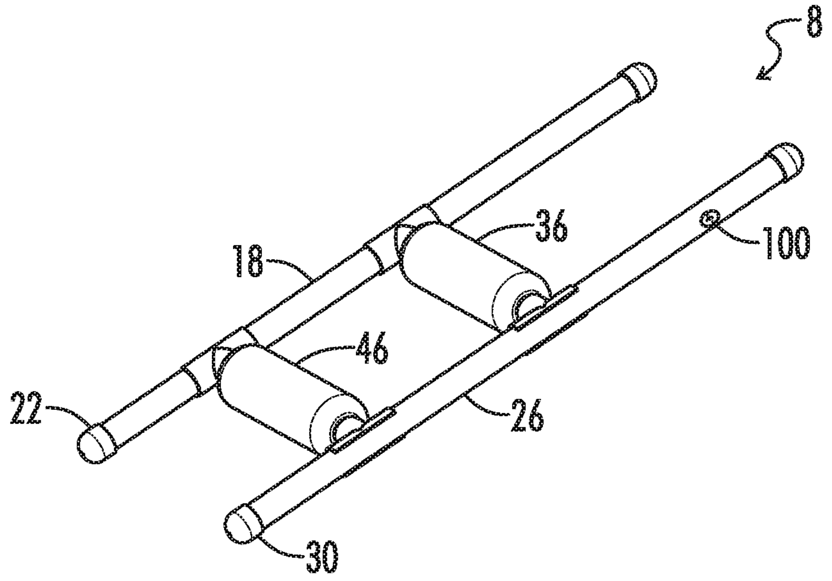
FIG. 1 illustrates a side perspective view of a knee rehabilitation device of one embodiment of the present invention in which the left and right posts are straight.
Figure 2:
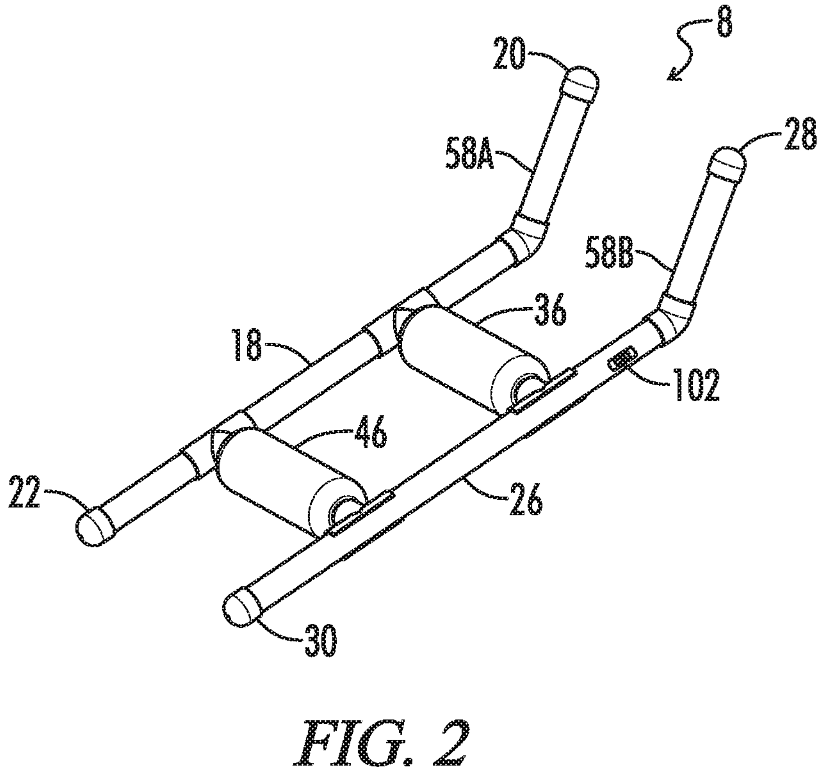
FIG. 2 illustrates a side perspective view of a knee rehabilitation device of another embodiment of the present invention in which the top sections of the left and right posts are angled.

With reference to FIGS. 1-9 provides a knee rehabilitation device 8 configured to increase the range of motion of a leg 10 of a human user having a first side 12 (e.g., a front side) and a second side 14 (e.g., a rear side) opposite the first side 12 and a knee 16. In the drawings, not all reference numbers are included in each drawing for the sake of clarity.

FIGS. 1-9 are drawn generally to scale, however, it will be appreciated that other dimensions are possible.

In some embodiments, the knee rehabilitation device 8 includes a left post 18 having a left post top end 20, a left post bottom end 22 comprising a non-slip surface and configured to rest on the ground, and a left post height 24 extending from the left post top end 20 to the left post bottom end 22. The knee rehabilitation device 8 may also include a right post 26 having a right post top end 28, a right post bottom end 30 comprising a non-slip surface and configured to rest on the ground, and a right post height 32 extending from the right post top end 28 to the right post bottom end 30, the right post height 32 generally parallel to the left post height 24.

The knee rehabilitation device 8 may further include an upper transverse bar 34 extending between the left post 18 and the right post 26, the upper transverse bar 34 comprising a foam pad 36 configured to rest against the first side of the user's leg 12, the upper transverse bar 34 slideably attached to the left post 18 and the right post 26 and configured to slide along the left post height 24 and the right post height 32. The upper transverse bar 34 may include an upper transverse bar left end 38, an upper transverse bar right end 40, and an upper transverse bar length 42 extending from the upper transverse bar left end 38 to the upper transverse bar right end 40, the upper transverse bar length 42 transverse to the left post height 24 and the right post height 32. The knee rehabilitation device 8 may further include a lower transverse bar 44 located below the upper transverse bar 34 and extending between the left post 18 and the right post 26, the lower transverse bar 44 comprising a foam pad 46 configured to rest against the user's leg 10 below the user's knee 16, the lower transverse bar 44 slideably attached to the left post 18 and the right post 26 and configured to slide along the left post height 24 and the right post height 32, the lower transverse bar 44 comprising a lower transverse bar left end 48, a lower transverse bar right end 50, and an lower transverse bar length 52 extending from the lower transverse bar left end 48 to the lower transverse bar right end 50, the lower transverse bar length 52 transverse to the left post height 24 and the right post height 32. The lower and upper transverse bars 44 and 34 may be oriented so they are perpendicular to the left post 18 and right post 26.

Optionally, the left post 18 and the right post 26 are rigid and the upper transverse bar 34 and the lower transverse bar 44, with the possible exception of the foam pads 36 and 46, are rigid (e.g., the frames of the upper transverse bar 34 and lower transverse bar 44 may be rigid plastic). For example, the left and right posts 18 and 26 and the transverse bars 34 and 44 may be comprised of rigid plastic.

The foam pads 36 and 46 may be closed cell and may be similar in composition to a pool noodle and may be flexible prior to insertion on the transverse bars 34 and 44. In an exemplary embodiment, the foam may have a density of for example between about 1.35 and about 3.3 pounds per cubic feet.

Figure 3A:
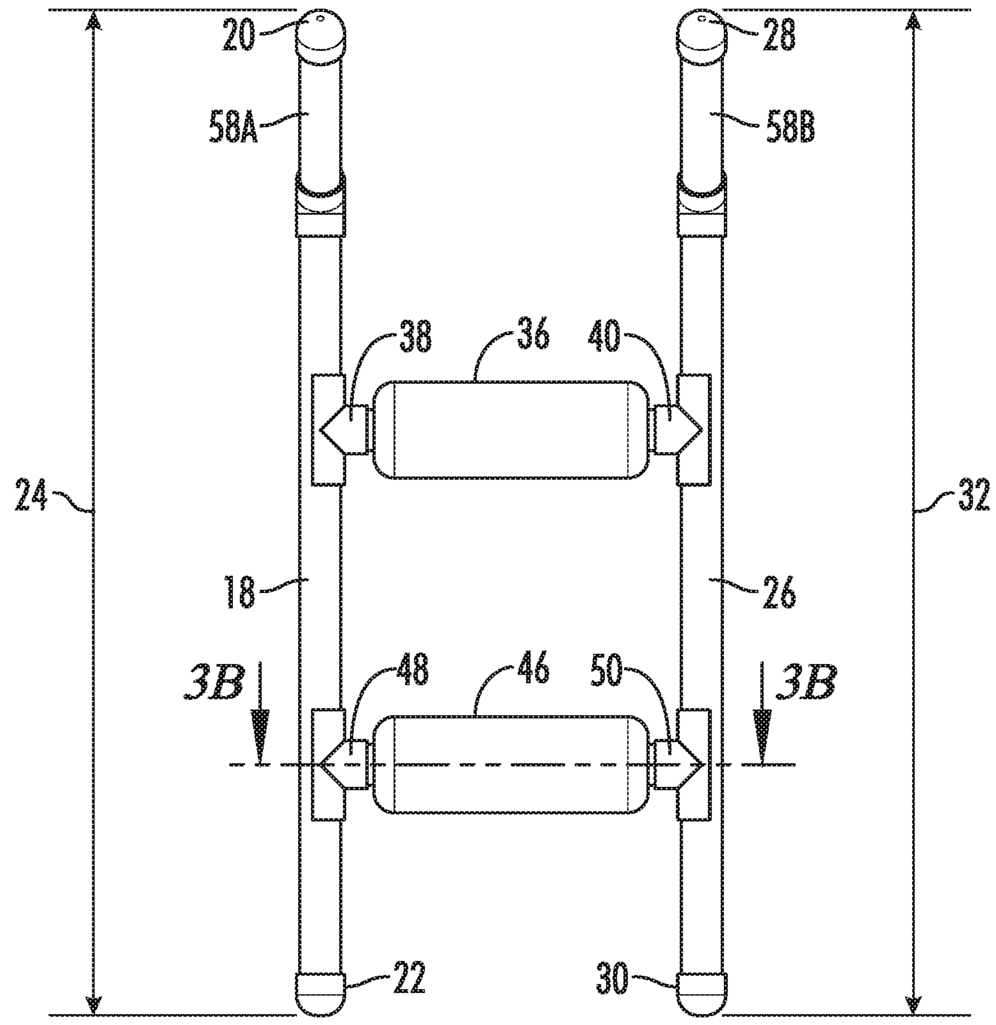
FIG. 3A illustrates a front perspective view of the knee rehabilitation device of FIG. 2.
Figure 3B:
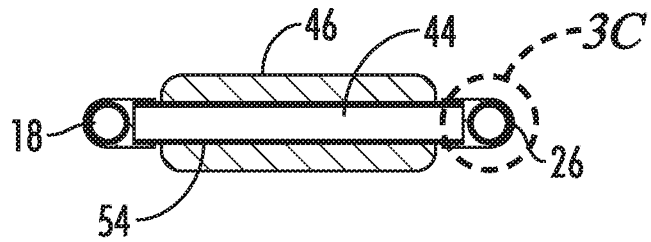
FIG. 3B illustrates a sectional view taken along line 3B-3B of FIG. 3A.
Figure 3C:
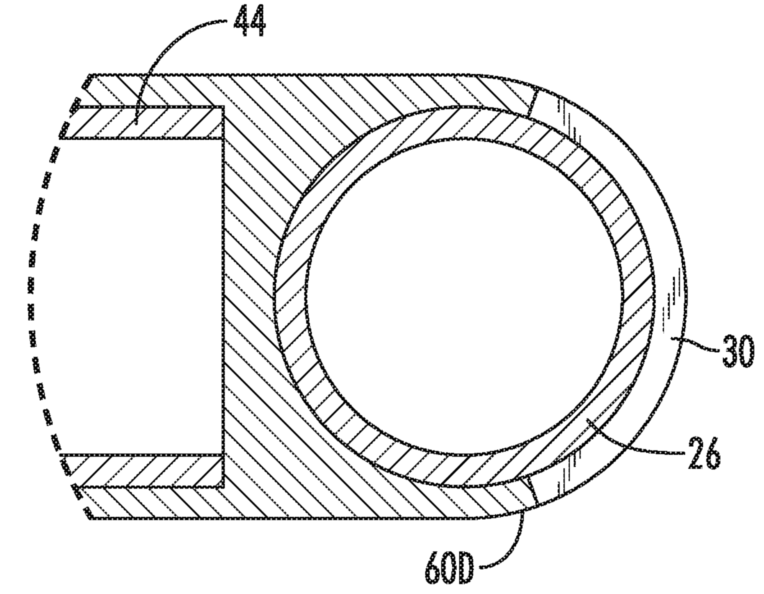
FIG. 3C illustrates a closeup view of the area circled 3C in FIG. 3B.
Figure 3D:
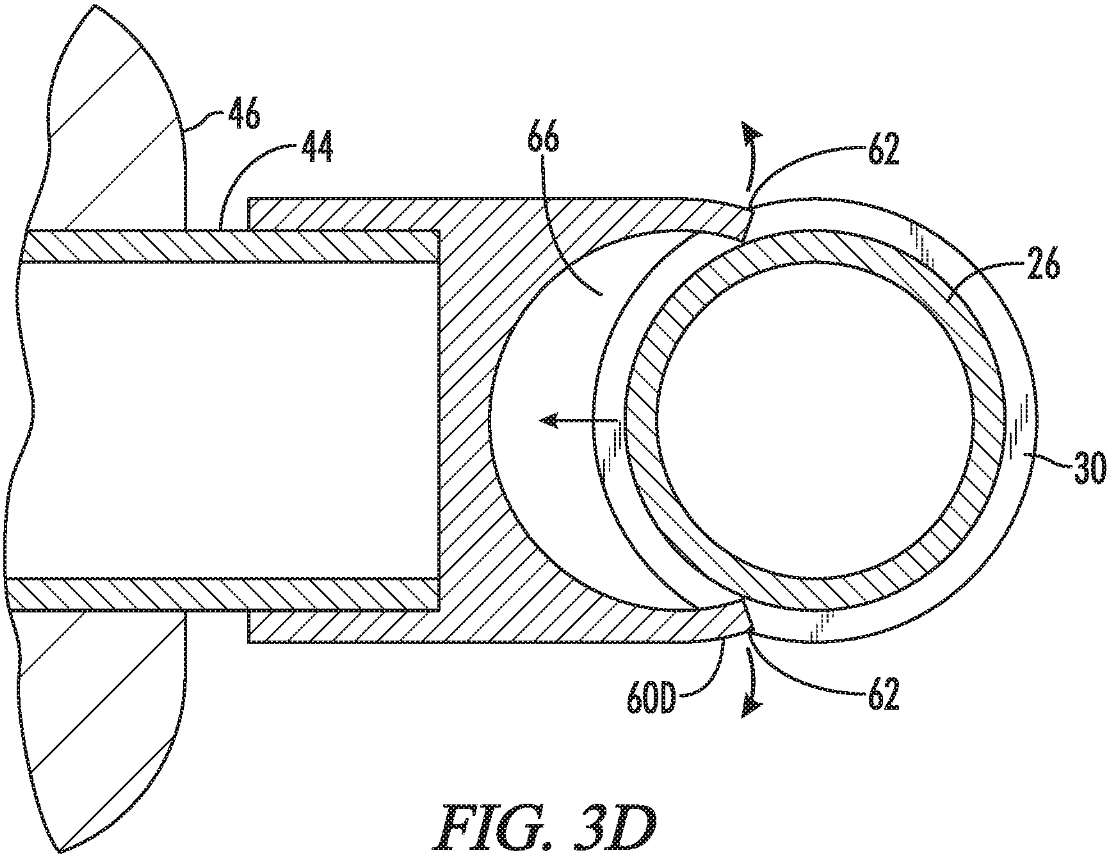
FIG. 3D illustrates a closeup view of the area circled 3C in FIG. 3B.
Figure 4A:
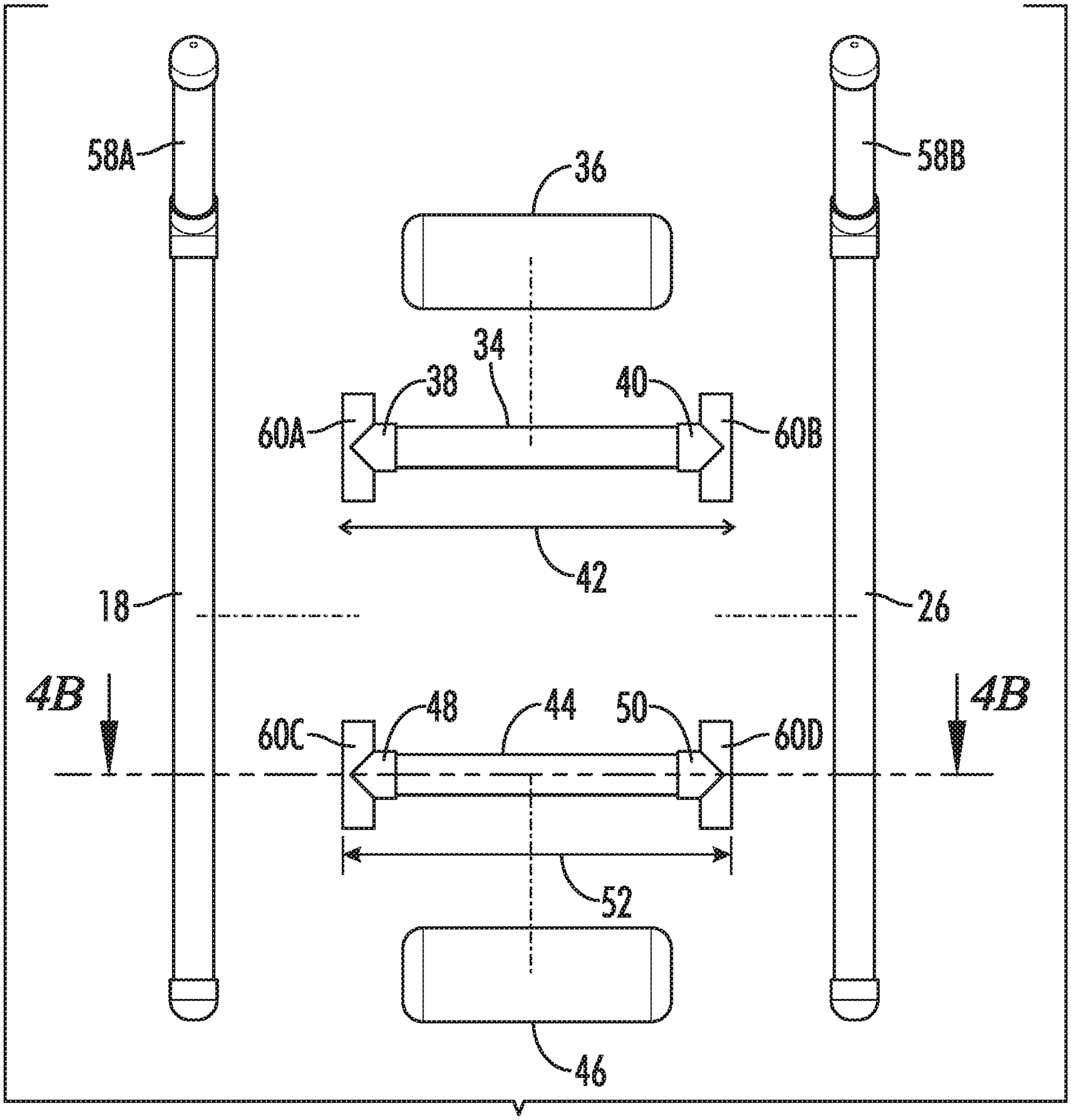
FIG. 4A illustrates a front exploded view of the knee rehabilitation device of FIG. 2.
Figure 4B:
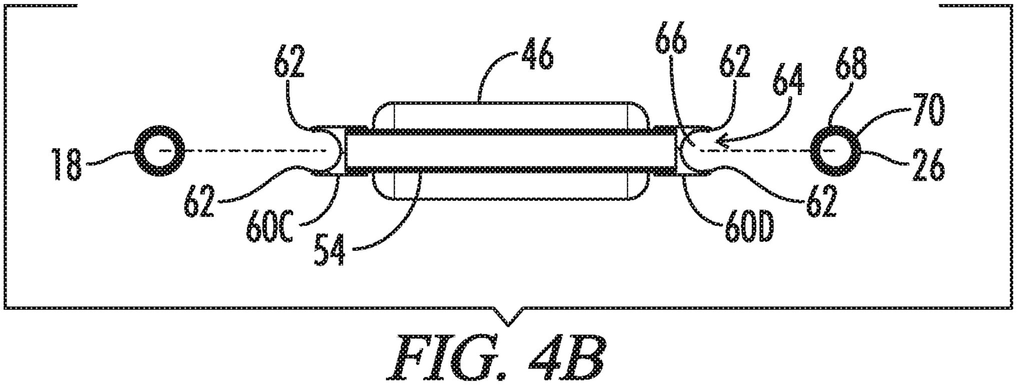
FIG. 4B illustrates a sectional view taken along line 4B-4B of FIG. 4A.
Figure 5A:
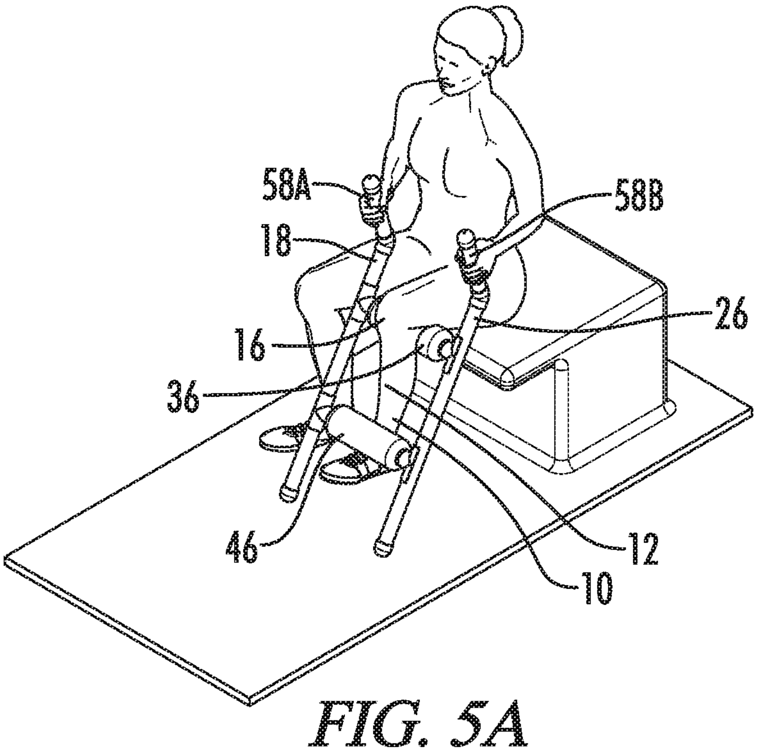
FIG. 5A and FIG. 5B illustrate a front perspective view of the knee rehabilitation device of FIG. 2 used in a knee flexion exercise.
Figure 5B:
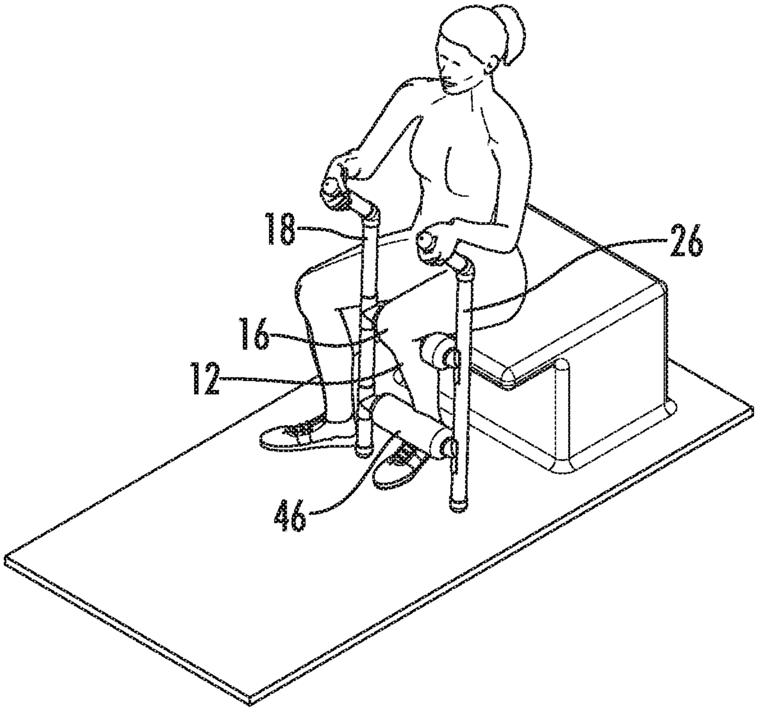
Figure 6A:
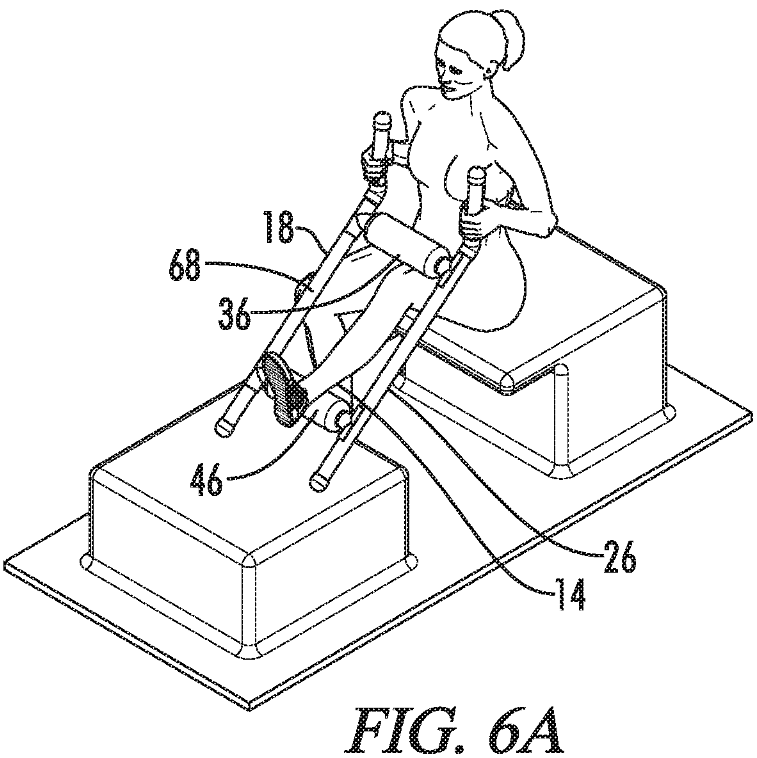
FIG. 6A and FIG. 6B illustrate a front perspective view of the knee rehabilitation device of FIG. 2 used in a knee extension exercise.
Figure 6B:
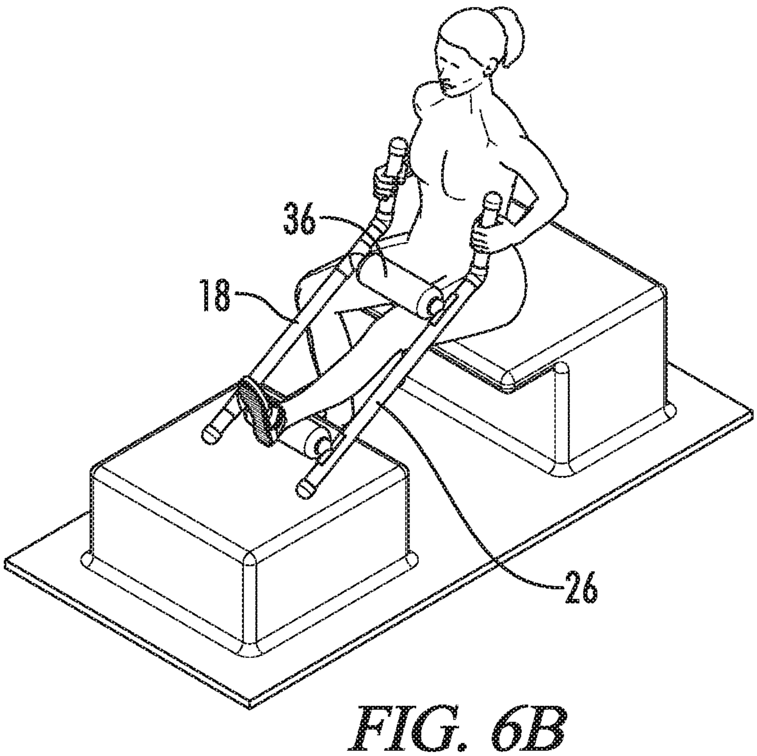
Figure 7:
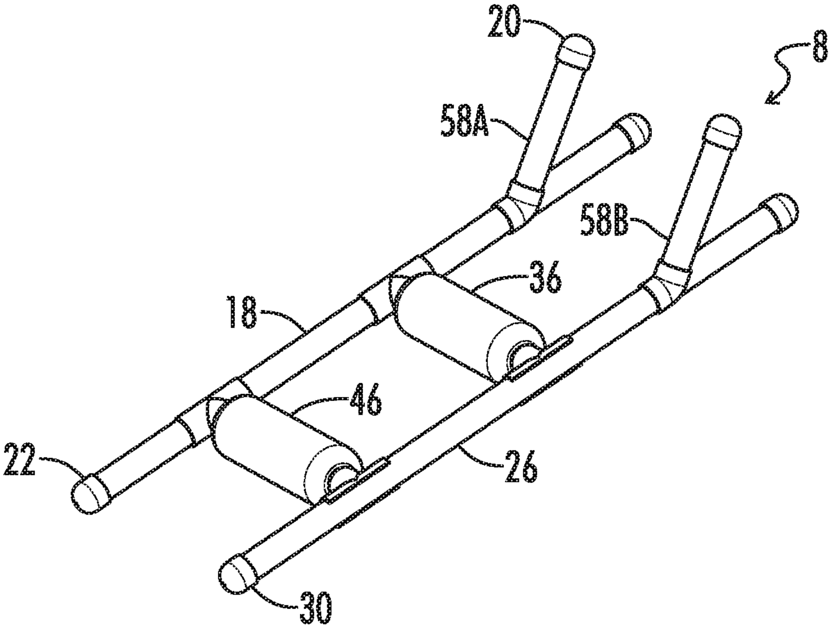
FIG. 7 illustrates a side perspective view of a knee rehabilitation device of another embodiment of the present invention in which the left and right posts include top sections that are both straight and angled.
Figure 8:
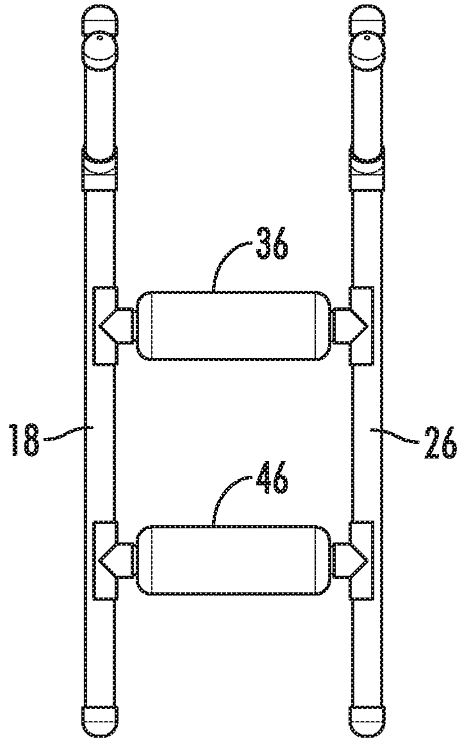
FIG. 8 illustrates a front elevation view of the knee rehabilitation device of FIG. 7.
Figure 9:
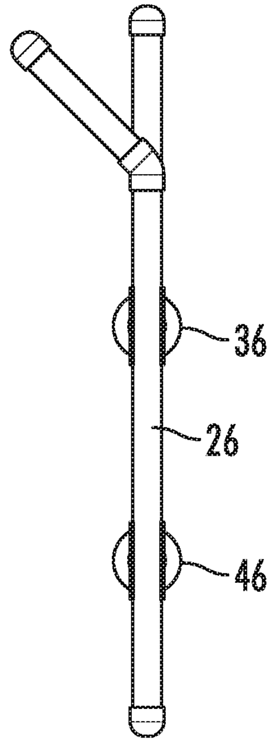
FIG. 9 illustrates a side elevation view of the knee rehabilitation device of FIG. 7.

Optionally, the left end 38 of the upper transverse bar 34 and the left end 48 of the lower transverse bar 44 each comprise a clamp 60A, and 60C attaching (preferably removably and slideably attaching) the transverse bars 34 and 44 to the left post 18 and the right end 40 of the upper transverse bar 34 and the right end 50 of the lower transverse bar 44 each comprise a clamp 60B and 60D attaching the transverse bars 34 and 44 to the right post 26, the clamps 60A, 60B, 60C and 60D slideable along at least a segment of the left post and right post heights 24 and 32. Optionally, the clamps 60A, 60B, 60C and 60D are c-clamps, and the posts 18 and 26 are removably snapped into the clamps 60A, 60B, 60C and 60D as shown in FIG. 3D. Having parts snap together makes the device 8 easier to carry and transport. Preferably, as shown in FIGS. 1-9, the upper and lower transverse bars 34 and 44 are not attached to each other so they are independently moveable.

In some embodiments, the clamps 60A, 60B, 60C and 60D and upper and lower transverse bars 34 and 44 are configured to slide at least about 6 inches (e.g., 6 inches to 7 feet) along the left post height 24 and right post height 32. The clamps 60A, 60B, 60C and 60D may include deflectable ends 62 that form side openings 64. The side openings 64 may lead to generally hollow interiors 66 for receiving the left and right posts 18 and 26. The left and right posts 18 and 26 may include interior surfaces 68 and outside surfaces 70.

Optionally, the foam pad 36 of the upper transverse bar 34 is cylindrical in shape and comprises a hole 54 receiving the upper transverse bar 34 and further wherein the foam pad 46 of the lower transverse bar 44 is cylindrical in shape and comprises a hole 54 receiving the lower transverse bar 44.

Optionally, the left post 18 and the right post 26 are cylindrical in shape to facilitate slide of the upper and lower transverse bars 34 and 44. Optionally, the upper and lower transverse bars 34 and 44 are generally cylindrical in shape.

Optionally, the lower transverse bar 44 and the upper transverse bar 34 each comprise a center and the device 8 is symmetrical (left-right) about the centers, as shown in FIGS. 1-9.

In some embodiments, the left post top end 20 and the right post top end 28 comprise a pivoting handle 58A and 58B. In some embodiments, the left post top end 20 and the right post top end 28 are curved relative to the left post bottom end 22 and right post bottom end 30 to create a handle 58A and 58B and to facilitate use of the device 8 by overweight or obese individuals.

In some embodiments, the upper and lower transverse bars 34 and 44 are curved. However, preferably, the upper and lower transverse bars 34 and 44 are generally straight.

Optionally, the left post 18 is a mirror image of the right post 26 and the upper transverse bar 34 is a mirror image of the lower transverse bar 44, as shown in FIGS. 1-9.

Optionally, the left post height 24 and the right post height 32 are adjustable, which may be accomplished via telescoping sections for example.

Optionally, the device 8 is used in a leg 10 extension exercise that includes a) providing the knee rehabilitation device 8; b) positioning the foam pad 36 of the upper transverse bar 34 against the front side 12 of the human's leg 10 adjacent to the knee 16 and positioning the foam pad 46 of the lower transverse bar 44 against the rear side 14 of the human's leg 10 so that the user's legs 10 is in a bent position; and c) moving the top ends 20 and 28 of the left and right posts 18 and 26 downward so that the user's leg 10 begins to straighten.

The device 8 may also be used in a leg 10 flexion exercise that includes a) providing the knee rehabilitation device 8; b) positioning the foam pad 36 of the upper transverse bar 34 against the rear side 14 of the human's leg 10 behind the knee 16 and positioning the foam pad 46 of the lower transverse bar 44 against the front side 12 of the human's leg 10 so that the user's legs 10 is in a slightly bent position; and c) moving the top ends 20 and 28 of the left and right posts 18 and 26 (e.g., in a forward direction) so that the user's leg 10 becomes further bent.

The device 8 may also include gravity-based angle gauge/locator 100 such as the IRWIN Tools Magnetic Angle Locator (1794488) or the Wixey WR300 Digital Angle Gauge. In both cases, the user would have to calibrate the measurement based on a resting position, and then measure total angular deflection at maximum knee flexion/extension. Alternatively, a bubble level 102 may be used instead of an angle guage/locator.

Without being bound by any particular theory, it is believed that the knee rehabilitation device 8 increases knee 16 extension and flexion ROM by applying posterior, anterior and rotational joint mobilization forces to the knee 16. The device 8 solves the problem of increasing knee ROM post operatively following a total knee replacement, ACL surgery or any process whereby knee ROM is needed to be recovered. The device 8 will allow the patient to self mobilize the joint 16 and thereby provide access to techniques that would otherwise only be available by the direct hands on treatment of a therapist. This is beneficial because the device 8 may give therapists another trusted and functional tool to regain movement of the knee 16 postoperatively while allowing the therapist to focus on other skilled activities during their limited time with the patients. For the patient the device 8 may be beneficial because the device 8 will maximize their time with the therapist to work on other needed functions as insurance companies are continually decreasing the amount of therapy that will be paid for. For insurance companies and physicians the device 8 may decrease the amount of dollars spent on therapy services and improve outcomes for their patients.

In an exemplary embodiment, the left and right posts 18 and 26 may be, for example, three foot section of 1.5 inch diameter PVC pipe which are capped on each end 20 and 22 and 28 and 30 to provide a non-slip surface. The upper and lower transverse bars 34 and 44 may be, for example, 1 foot in length and 1 inch in diameter which are covered with 3 inch diameter foam pads 36 and 46 and attached to the left and right posts 18 and 26 by four PVC fittings 60A, 60B, 60C and 60D which allow the transverse bars 36 and 46 to slide up and down the left and right posts 18 and 26 as needed for positioning of the device 8. The device 8 can be modified, as shown in FIGS. 2-6, by placing a 45 degree angle at the top of the left and right posts 18 and 26. In addition, the device 8 may be modified by dropping one of the transverse bars 36 and 46 2 inches to the rear of the left and right posts 18 and 26. It will be appreciated that the dimensions and components in this paragraph are purely exemplary and the device 8 may be modified depending on the environment of use.

Without being bound by any particular theory, it is believed that the knee rehabilitation device 8 works by forcing the patient to provide optimal stretching techniques to the affected joint by holding the leg 10 in place and as the patient provides and controls the amount of force during flexion and extension of the knee 16 the device 8 simultaneously creates anterior, posterior and rotational joint mobilization forces through the knee joint 16 respectively. The production of these joint mobilization forces at the right time, in the proper location and direction are what allows this product to effectively and efficiently improve ROM at the knee 16.

| | |
|---|---|
| system | 8 |
| Leg | 10 |
| First side of leg | 12 |
| Second side of leg | 14 |
| knee | 16 |
| left post | 18 |
| left post top end | 20 |
| left post bottom end | 22 |
| left post height | 24 |
| right post | 26 |

-continued

| | |
|---|---|
| right post top end | 28 |
| right post bottom end | 30 |
| right post height | 32 |
| upper transverse bar | 34 |
| upper transverse bar foam pad | 36 |
| upper transverse bar left end | 38 |
| upper transverse bar right end | 40 |
| upper transverse bar length | 42 |
| lower transverse bar | 44 |
| lower transverse bar foam pad | 46 |
| lower transverse bar left end | 48 |
| lower transverse bar right end | 50 |
| lower transverse bar length | 52 |
| foam pad hole | 54 |
| handle | 58A and 58B |
| clamps | 60A-60D |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A knee rehabilitation device configured to increase the range of motion of a leg of a human user having a first side and a second side opposite the first side and a knee comprising:

a) a left post having a left post top end, a left post bottom end configured to rest on the ground, a left post height extending from the left post top end to the left post bottom end, an interior surface configured to face the user's leg, and an outside surface;

b) a right post having a right post top end, a right post bottom end configured to rest on the ground, a right post height extending from the right post top end to the right post bottom end, an interior surface configured to face the user's leg, and an outside surface, the right post height generally parallel to the left post height, the interior surfaces of the left and right posts facing each other and the outside surfaces of the left and right posts facing away from each other;

c) an upper transverse bar extending between the left post and the right post, the upper transverse bar comprising a foam pad configured to rest against the first side of the user's leg, the upper transverse bar comprising a left end comprising a left end c-clamp, a right end comprising a right end c-clamp, and a length extending from the left end to the right end, the upper transverse bar slideably attached to the left post and the right post by the left end and right end c-clamps of the upper transverse bar, the left end and right end c-clamps configured to slide along the interior surfaces of the left post and right post for at least a segment of the left post height and the right post height;

d) a lower transverse bar located below the upper transverse bar and above the left post bottom end and the right post bottom end and extending between the left post and the right post, the lower transverse bar comprising a foam pad configured to rest against the second side of the user's leg, the lower transverse bar comprising a left end comprising a left end c-clamp, a right end comprising a right end c-clamp, and a length extending from the left end to the right end, the lower transverse bar slideably attached to the left post and the right post by the left and right end c-clamps of the lower transverse bar, the left end and right end c-clamps configured to slide along the interior surfaces of the left and right posts for at least a segment of the left post height and the right post height, wherein the lower transverse bar and upper transverse bar are independently movable, wherein the left post top is not attached to the right post top end, wherein the left post bottom end is not attached to the right post bottom end, wherein the left post and the right post are rigid, wherein each of said left end c-clamps comprises a left side opening leading to a generally hollow interior receiving said left post, wherein each of said right end c-clamps comprises a right side opening leading to a generally hollow interior receiving said right post, wherein the left side opening of the left end c-clamp of the upper tranverse bar faces away from the right side opening of the right end c-clamp of the upper transverse bar and toward the interior surface of the left post, and further wherein the left side opening of the left end c-clamp of the lower tranverse bar faces away from the right side opening of the right end c-clamp of the lower transverse bar and toward the interior surface of the left post.

2. The knee rehabilitation device of claim 1 wherein each of said c-clamps does not include a lock for fixing the c-clamp in place along the left post or right post height.

3. The knee rehabilitation device of claim 1 wherein the upper transverse bar and the lower transverse bar are the sole points of attachment of the left post to the right post.

4. The knee rehabilitation device of claim 1 wherein the c-clamps removably attach the upper and lower transverse bars to the left and right posts, wherein each c-clamp comprises two deflectable ends forming a side opening and further wherein the deflectable ends are configured to deflect and allow the left or right post to snap into place in said generally hollow interior of said c-clamp.

5. The knee rehabilitation device of claim 1 wherein each of the right post top end, the right post bottom end, the left post top end and the left post bottom end are free.

6. The knee rehabilitation device of claim 1 wherein the foam pad of the upper transverse bar is cylindrical in shape and comprises a hole receiving the upper transverse bar and further wherein the foam pad of the lower transverse bar is cylindrical in shape and comprises a hole receiving the lower transverse bar.

7. The knee rehabilitation device of claim 1 wherein the lower transverse bar and the upper transverse bar each comprise a center and the device is symmetrical about the centers of the lower transverse bar and upper transverse bar.

8. The knee rehabilitation device of claim 1 wherein the left post top end is curved relative to the left post bottom end and the right post top end is curved relative to the right post bottom end and further wherein the upper and lower tranverse bars are perpendicular to the left and right post.

9. The knee rehabilitation device of claim 1 wherein the device left post, right post, upper transverse bar and lower transverse bar are comprised of rigid plastic.

10. The knee rehabilitation device of claim 1 wherein the left post is a mirror image of the right post and the upper transverse bar is a mirror image of the lower transverse bar.

11. The knee rehabilitation device of claim 1 wherein the left post height and the right post height are adjustable.

12. The knee rehabilitation device of claim 1 wherein the knee rehabilitation device is comprised of biocompatible plastics.

13. The knee rehabilitation device of claim 1 further comprising an angle gauge configured to measure orientation of the device.

14. The knee rehabilitation device of claim 13 wherein the gauge is attached to the left post or the right post.

15. A method of increasing range of motion of a leg of a human, wherein the human's leg has a knee, a foot, a front side and a rear side, the method comprising the steps of:

a) providing the knee rehabilitation device of claim 1;

b) positioning the foam pad of the upper transverse bar against the front side of the human's leg above the knee, positioning the foam pad of the lower transverse bar against the rear side of the human's leg and below the knee and above the foot so that the user's leg is in a bent position and positioning the bottom ends of the left and right posts on a flat surface; and c) moving the top ends of the left and right posts so that the user's leg begins to straighten, wherein, during steps a)-c), the interior surfaces of the left and right posts face the human's leg and the side openings of the c-clamps face laterally away from the human's leg.

16. The method of claim 15 wherein during steps a)-c), the upper transverse bar and lower transverse bar are not locked into place along the left post or right post heights.

17. A method of increasing range of motion of a leg of a human, wherein the human's leg has a knee, a thigh, a foot, a front side and a rear side, the method comprising the steps of:

a) providing the knee rehabilitation device of claim 1;

b) positioning the foam pad of the upper transverse bar against the thigh on the rear side of the human's leg behind the knee, positioning the foam pad of the lower transverse bar against the front side of the human's leg and below the knee and above the foot so that the user's leg is in a slightly bent position and positioning the bottom ends of the left and right posts on the ground; and c) moving the top ends of the left and right posts so that the user's leg becomes further bent, wherein, during steps a)-c), the interior surfaces of the left and right posts face the human's leg and the side openings of the c-clamps face laterally away from the human's leg.

18. The method of claim 17 wherein during steps a)-c), the upper transverse bar and lower transverse bar are not locked into place along the left post or right post heights.

19. A method of increasing range of motion of a leg of a human, wherein the human's leg has a knee, a foot, a front side and a rear side, the method comprising the steps of:

a) providing a knee rehabilitation device comprising:

i) a left post having a left post top end, a left post bottom end configured to rest on the ground, and a left post height extending from the left post top end to the left post bottom end;

ii) a right post having a right post top end, a right post bottom end configured to rest on the ground, and a right post height extending from the right post top end to the right post bottom end, the right post height generally parallel to the left post height;

iii) an upper transverse bar extending between the left post and the right post, the upper transverse bar comprising a foam pad configured to rest against the front side of the user's leg, the upper transverse bar slideably attached to the left post and the right post and configured to slide along at least a segment of the left post height and the right post height, the upper transverse bar comprising an upper transverse bar left end, an upper transverse bar right end, and an upper transverse bar length extending from the upper transverse bar left end to the upper transverse bar right end;

iv) a lower transverse bar located below the upper transverse bar and above the left post bottom end and the right post bottom end and extending between the left post and the right post, the lower transverse bar comprising a foam pad configured to rest against the rear side of the user's leg, the lower transverse bar slideably attached to the left post and the right post and configured to slide along at least a segment of the left post height and the right post height, the lower transverse bar comprising a lower transverse bar left end, a lower transverse bar right end, and a lower transverse bar length extending from the lower transverse bar left end to the lower transverse bar right end, wherein the lower transverse bar and upper transverse bar are independently movable, wherein the left post top end is not attached to the right post top end, and further wherein the left post bottom end is not attached to the right post bottom end;

b) positioning the foam pad of the upper transverse bar against the front side of the human's leg above the knee, positioning the foam pad of the lower transverse bar against the rear side of the human's leg below the knee and above the foot so that the user's leg is in a bent position and positioning the bottom ends of the left and right post on a flat surface; and c) moving the top ends of the left and right posts so that the user's leg begins to straighten, wherein, during steps a)-c), the upper transverse bar and lower transverse bar are not locked into place along the left post or right post heights, and further wherein the upper and lower tranverse bars are perpendicular to the left and right post.

20. A method of increasing range of motion of a leg of a human, wherein the human's leg has a knee, a thigh, a foot, a front side and a rear side, the method comprising the steps of:

a) providing a knee rehabilitation device comprising:

i) a left post having a left post top end, a left post bottom end configured to rest on the ground, and a left post height extending from the left post top end to the left post bottom end;

ii) a right post having a right post top end, a right post bottom end configured to rest on the ground, and a right post height extending from the right post top end to the right post bottom end, the right post height generally parallel to the left post height;

iii) an upper transverse bar extending between the left post and the right post, the upper transverse bar comprising a foam pad configured to rest against the rear side of the user's leg behind the knee, the upper transverse bar slideably attached to the left post and the right post and configured to slide along at least a segment of the left post height and the right post height, the upper transverse bar comprising an upper transverse bar left end, an upper transverse bar right end, and an upper transverse bar length extending from the upper transverse bar left end to the upper transverse bar right end, the upper transverse bar length transverse to the left post height and the right post height;

iv) a lower transverse bar located below the upper transverse bar and above the left post bottom end and the right post bottom end and extending between the left post and the right post, the lower transverse bar comprising a foam pad configured to rest against the front side of the user's leg below the knee, the lower transverse bar slideably attached to the left post and the right post and configured to slide along at least a segment of the left post height and the right post height, the lower transverse bar comprising a lower transverse bar left end, a lower transverse bar right end, and a lower transverse bar length extending from the lower transverse bar left end to the lower transverse bar right end, the lower transverse bar length transverse to the left post height and the right post height, wherein the lower transverse bar and upper transverse bar are independently movable, wherein the left post top end is not attached to the right post top end, and further wherein the left post bottom end is not attached to the right post bottom end;

b) positioning the foam pad of the upper transverse bar against the thigh on the rear side of the human's leg behind the knee, positioning the foam pad of the lower transverse bar against the front side of the human's leg below the knee and above the foot so that the user's leg is in a slightly bent position, and positioning the bottom ends of the left and right posts on the ground; and c) moving the top ends of the left and right posts so that the user's leg becomes further bent, wherein, during steps a)-c), the upper transverse bar and lower transverse bar are not locked into place along the left post or right post heights, and further wherein the upper and lower tranverse bars are perpendicular to the left and right post.

21. The method of claim 20 wherein the upper transverse bar and lower transverse bar are linear.

22. The knee rehabilitation device of claim 1 wherein the upper transverse bar is linear between the left and right c-clamps of the upper transverse bar, wherein the lower transverse bar is linear between the left and right c-clamps of the lower transverse bar.

23. The method of claim 19 wherein the upper transverse bar and lower transverse bar are linear.

24. The method of claim 1 wherein the left post and right post are generally cylindrical.

* * * * *